United States Patent [19]
Wittke

[11] Patent Number: 5,184,981
[45] Date of Patent: Feb. 9, 1993

[54] CAM LOADED CONTINUOUSLY VARIABLE TRANSMISSION

[76] Inventor: Ernest C. Wittke, 585 Bloomfield Ave., West Caldwell, N.J. 07006

[21] Appl. No.: 638,206

[22] Filed: Jan. 7, 1991

[51] Int. Cl.⁵ ............................................. F16H 9/12
[52] U.S. Cl. ....................................... 474/19; 474/18; 474/28
[58] Field of Search ............... 474/8, 17, 18, 19, 20, 474/21, 28, 29, 70

[56] References Cited

U.S. PATENT DOCUMENTS

| | | |
|---|---|---|
| Re. 33,126 | 2/1989 | Wittke . |
| 3,600,960 | 8/1971 | Karig ....................... 474/28 |
| 3,822,610 | 7/1974 | Erban . |
| 4,261,213 | 4/1981 | Rattunde .................. 474/28 |
| 4,524,642 | 6/1985 | Fritsch . |
| 4,568,317 | 2/1986 | Stever ...................... 474/19 |
| 4,583,423 | 4/1986 | Hahne ...................... 474/28 |
| 4,601,681 | 7/1986 | Costelli .................... 474/28 |
| 4,612,003 | 9/1986 | Ohzono .................... 474/28 |
| 4,722,718 | 2/1988 | Eugen ...................... 474/19 |
| 4,735,597 | 4/1988 | Cadée ...................... 474/28 |

FOREIGN PATENT DOCUMENTS 668088  8/1963  Canada ................... 474/28

OTHER PUBLICATIONS

Finally-CVT, Popular Science, Sep. 1987, pp. 56-59.

*Primary Examiner*—Renee S. Luebke
*Assistant Examiner*—F. Saether

[57] ABSTRACT

A continuously variable transmission utilizes a cam loading device with a hydraulically controlled CVT of the metal V-belt type. The cam loading device applies an axial loading force to the pulley flanges in proportion to the output torque. A hydraulic mechanism positions the pulley flanges to compensate for the limited axial movement of the cam mechanism. A preload spring and hydraulic cushion provide a necessary preload while cushioning shock from reversal of torque. The loading force on the CVT is permitted to vary with the output torque to provide improved efficiency for a full range of automotive driving conditions.

12 Claims, 4 Drawing Sheets

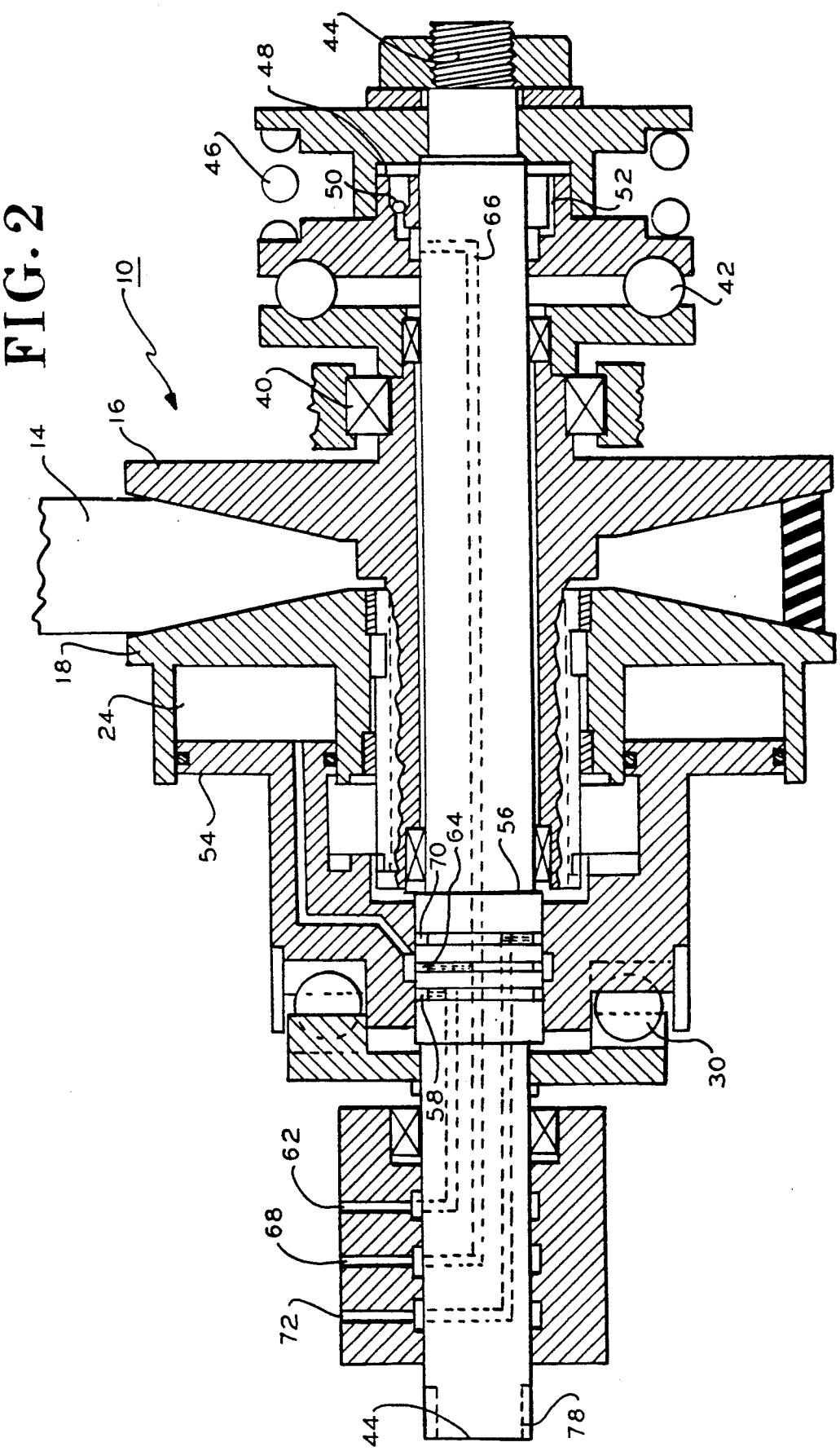

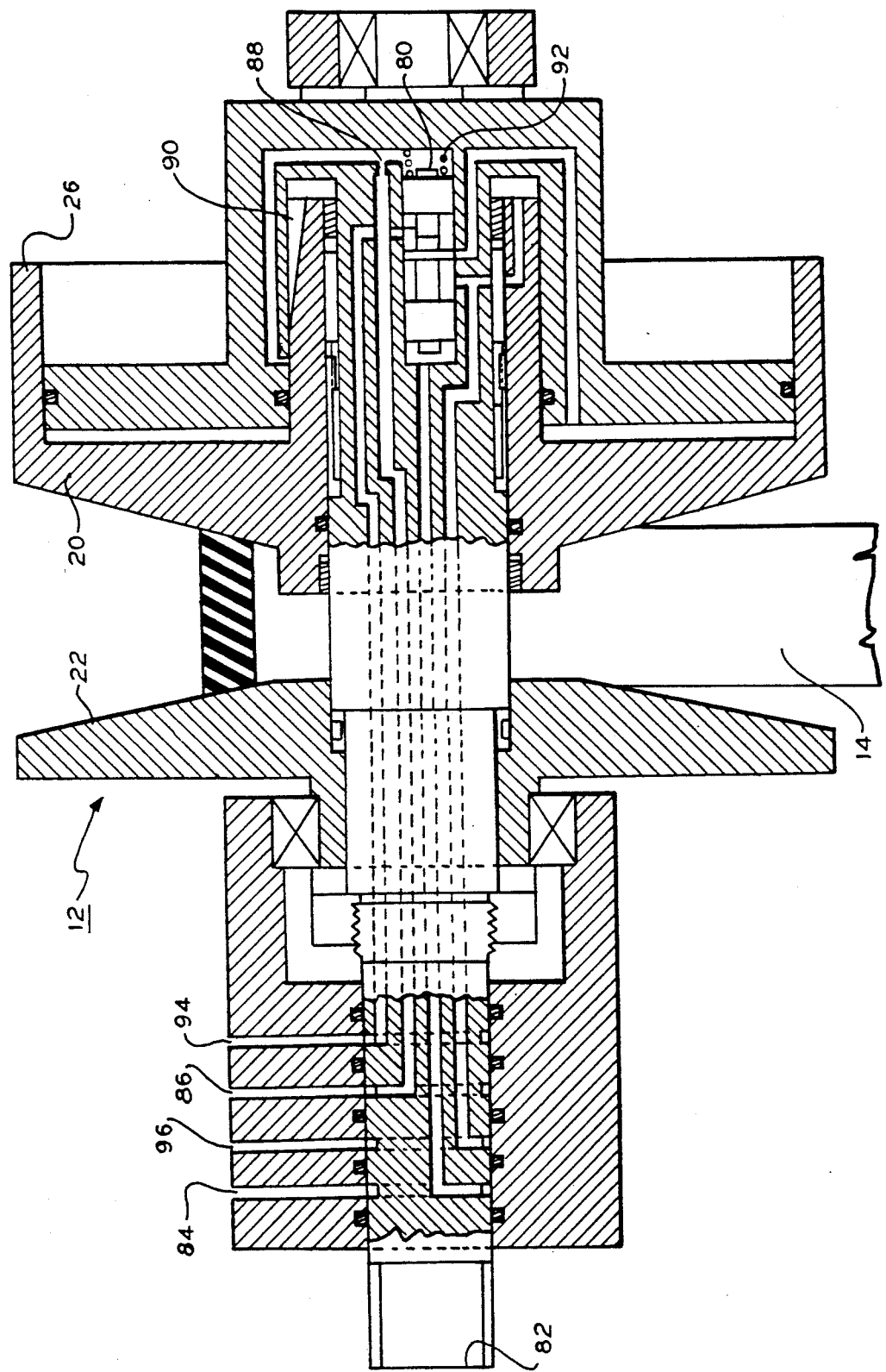

CAM LOADED CONTINUOUSLY VARIABLE TRANSMISSION

BACKGROUND OF THE INVENTION

The present invention relates to variable speed transmissions and particularly to an improved continuously variable automotive transmission utilizing a cam loading device which permits the contact loading force on the CVT to vary with the output torque requirements of the driving conditions. This results in greater efficiency of the CVT for light loads as well as high load conditions.

DESCRIPTION OF THE PRIOR ART

Presently available continuously variable transmissions generally rely on high contact forces to prevent slippage at high torque levels. This results in high friction losses and poor efficiency under normal low load driving conditions. One known CVT design does incorporate variable loading as a function of torque load. This is shown in U.S. Pat. No. 3,822,610 to Erban wherein a cam loading device is described in conjunction with a toroidal disc CVT mechanism to apply axial force in proportion to the output torque. This device, however, utilizes excessive loading of the rolling contact planetary mechanism which reduces efficiency at some speeds and requires larger sizes and weights for a given capacity. A particular application of a cam loading device with a variable transmission is described in U.S. Pat. No. 4,524,642 to Fritsch. This specific structure is not designed for general automotive use requiring widely varying load conditions. Another related device which improves the efficiencies of CVT's is described in U.S. Pat. No. RE 33,125 to Wittke, the present inventor. Difficulties with other known CVT's are described therein, such as the type utilizing a flexible metal V-belt drive. A relatively recent improvement in CVT's utilizing such metal drive belts is more fully discussed in an article published in Popular Science, September 1987, entitled "Finally-CVT". This device likewise is suitable for operation at a fixed torque load but is not adjustable as a function of the transmitted torque. Attempts to provide torque sensitive loading by control of a hydraulic loading mechanism have been limited by the slow response time of the hydraulic system. It is also necessary to restrict engine power output at low ratios to avoid the need for an undesirable level of preload. The present devices thus exhibit very poor part load efficiency.

SUMMARY OF THE INVENTION

It is therefore the primary object of the present invention to provide an improved continuously variable transmission which utilizes a cam loading device to achieve efficient operation under varying load conditions.

It is another object of the present invention to combine a cam loading device with a hydraulically controlled CVT of the metal V-belt type to provide the desired efficiency over the full range of automotive operating conditions.

A further object is to provide a cam loading device for a CVT which permits the contact loading force to vary with the output torque requirements.

An additional object is to utilize a cam loading mechanism to apply a loading force in proportion to the required output torque and a hydraulic mechanism for controlling the movements of the CVT metal belt and pulley arrangement.

A still further object is to provide an hydraulic cushion mechanism in a cam loaded CVT to prevent shock upon conditions of torque reversal.

These objects are achieved with a metal belt CVT which separates the functions of providing a necessary preload from the function of controlling the positioning of the pulley flanges of the belt drive. A cam loading mechanism is used to apply axial loading force to the pulley flanges in response to the output torque. A hydraulic mechanism is then used to position the pulley flanges to compensate for the limited axial movement of the cam mechanism. A thrust bearing transmits loading force from a center shaft to a pulley flange while the shaft rotates freely without dissipation of power by the thrust bearing. A preload spring and hydraulic cushion mechanism provide a preload and cushion shock upon torque reversal. Other objects and advantages will become apparent from the following description in conjunction with the accompanying drawings.

BRIEF DESCRIPTION OF THE DRAWINGS

FIG. 2 is a schematic side view in partial cross section of the loading pulley portion of the system including the cam loading and hydraulic cushion mechanism.

FIG. 4 is a schematic side view in partial cross section of the control pulley portion of the V-belt CVT system.

DESCRIPTION OF THE PREFERRED EMBODIMENT

Figure 1:
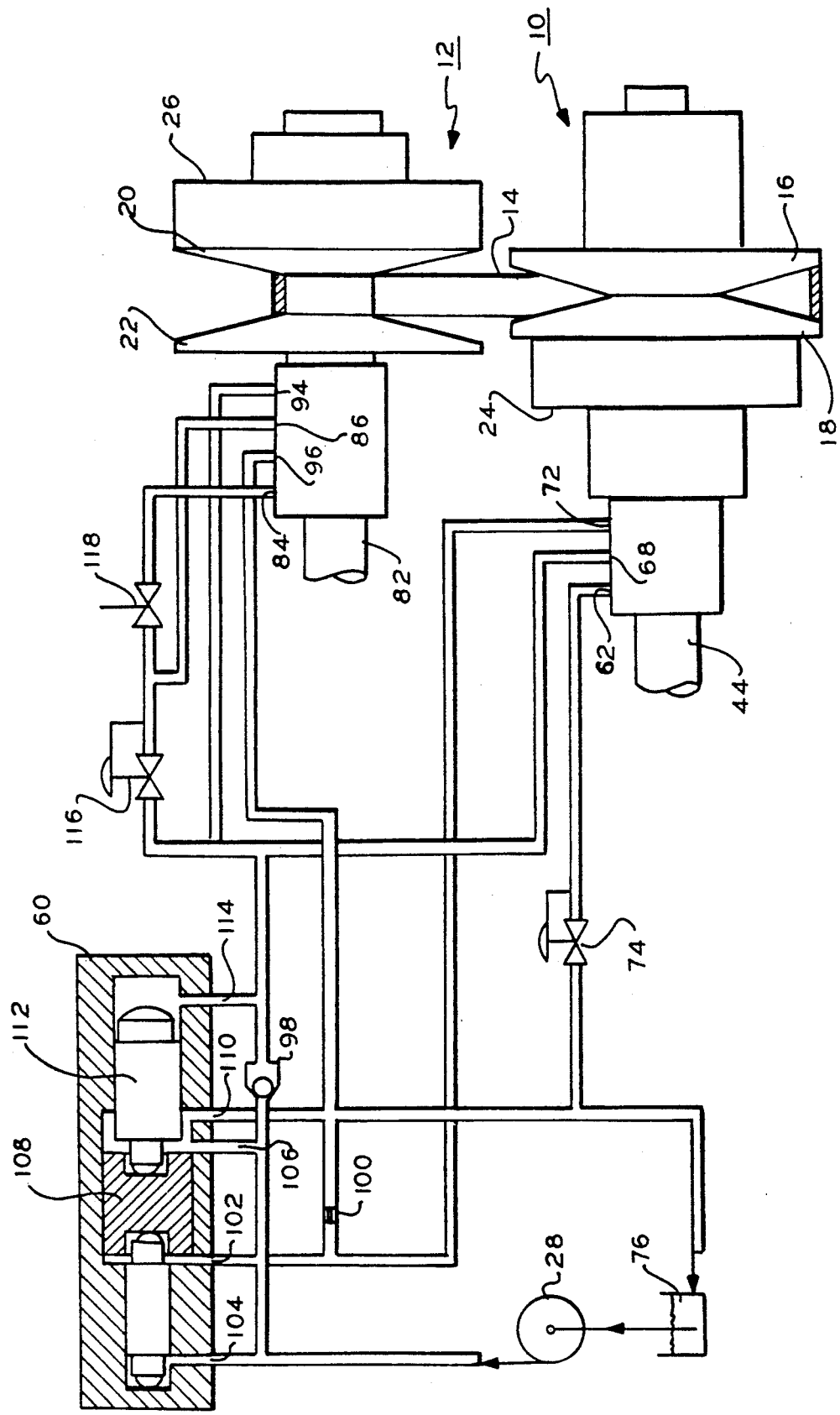
FIG. 1 is a schematic representation of the V-belt CVT system including the loading and control pulleys and hydraulic control mechanism.

As shown in FIG. 1, a metal V-belt CVT, which is one currently used for automotive purposes, achieves a variable ratio by varying the effective radius of each pulley 10, 12 of a V-belt drive. V-belt 14 is constructed to be wide, and the disc-shaped flanges 16, 18 of loading pulley 10 and 20, 22 of control pulley 12 are adjusted axially so as to cause the belt to ride up or down along the conical faces at a larger or smaller radius. By moving the flanges of each pulley respectively together or apart, the transmission ratio between the pulleys is increased or decreased while maintaining the belt length constant. When the flanges of one pulley move together, the flanges of the other pulley move apart as the belt is caused to move up or down. The V-belt is formed of thin metal spacers typically 300 to 350 in number and 2 mm in thickness, which serve to separate the flanges of the pulleys and which are held in a belt configuration by two parallel multilayer steel bands. The bands may be about 11 mm wide and 2 mm thick and are in tension. As the pulleys rotate, the spacers aligned along the belt are pushed from the driving pulley to the driven pulley to transmit the load torque. Providing that the pushing force does not exceed the tension in the belt, the column of spacers will not buckle and satisfactory operation occurs.

Since to transmit the necessary power, lubricated metals must be employed to achieve the required strength and durability, the coefficient of friction between the belts and pulleys is low, and an extremely high force is required to squeeze the belt between the flanges of each pulley. The mechanism which supplies this force must be active so as to allow the ratio to be adjusted and to maintain the desired level of force under all conditions. This can be accomplished by incorporating a hydraulic cylinder 24, 26 into each pulley which, by virtue of having an area essentially limited only by the pulley diameter, is capable of supplying the necessary force and controlling the position of the flange. One of the cylinders 24 of the driven or loading pulley 10 is made with a smaller area than the other cylinder 26 of the driving or control pulley 12 and is activated by the available hydraulic pressure from a prime mover engine driven pump 28. This loading cylinder 24 serves to maintain belt tension. The flange 20 of the other cylinder 26 having a larger area is activated by an appropriate hydraulic control, which may be a servo spool valve operating from the hydraulic pressure source in response to an external position command. The slope on the pulley flanges is selected such that the sine of its angle is larger than the coefficient of sliding friction of the lubricated metal of the belt and flange. This allows the loading cylinder to maintain the belt load and allows the control cylinder 26 to overpower the loading cylinder 24 by virtue of its larger area, and thereby permit the ratio of the CVT to be controlled. This type of belt loading, however, is not adjustable as a function of the transmitted torque.

Attempts to provide torque sensitive loading through control of the hydraulic loading mechanism have not been successful since the response time of a hydraulic system is too slow to permit adjustment of the load in response to changing torque loads. A further limitation has been the need to restrict engine power output at low ratios to avoid the need for an undesirable level of preload. This was necessary to provide adequate life and to prevent the part load efficiency from degrading further.

Figure 3A:
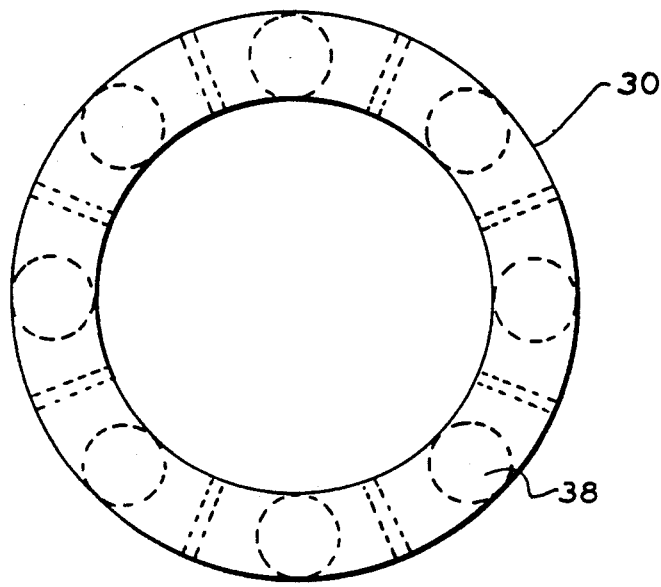
FIGS. 3a, 3b and 3c show a schematic end view and two side views in partial cross section of the cam loader device in open and closed positions.
Figure 3B:
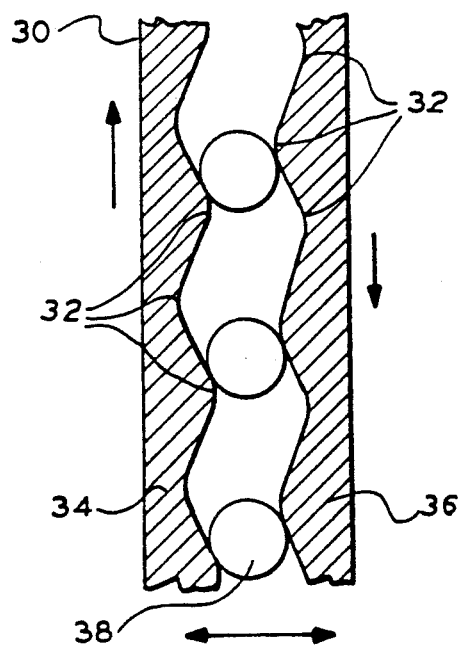
Figure 3C:
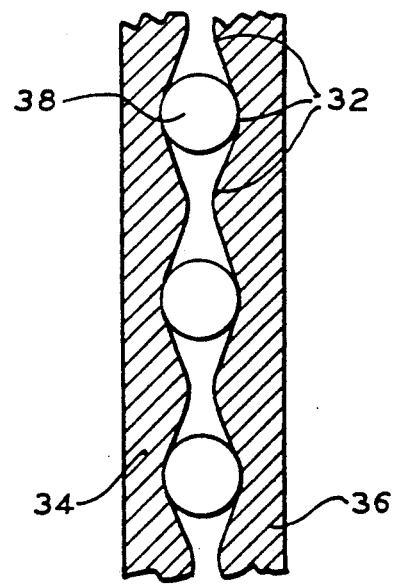

The limitations imposed by the preloading mechanism on the capabilities of the metal belt CVT can be overcome by separating the function of positioning the pulley flanges from the function of providing the necessary preload. Due to the large forces and displacements involved it is necessary to position the flanges hydraulically. Since hydraulics are too slow to apply the torque load reliably, the loading force is provided to the flanges by a mechanical loading mechanism in response to the output torque. The flanges are then repositioned by hydraulic means to compensate for the limited axial freedom of the mechanical loading mechanism. A cam loading mechanism 30, as shown in FIGS. 2 and 3, is ideal for applying an axial force in proportion to the applied load in real time, since the torque cannot exist without the presence of the required axial force.

The operation of a cam loading mechanism is described in U.S. Pat. No. 3,822,610 as previously noted. As shown in FIG. 3a, b and c, the cam loading mechanism 30 includes a series of axial cams 32 in the form of peaks and troughs on each face of a pair of torsional elements 34, 36. Each cam entraps a rolling element 38 such as a ball or roller. The application of torque between the torsional elements 34, 36 causes the rolling element 38 to force the cam faces apart. The slope of the cam surfaces and radius of the cam surfaces from the axis of the torsional elements causes an axial force to be produced which is proportional to the torque transmitted, with the forces applied instantaneously.

The cam loading mechanism by itself is not capable of operating over the large displacements of the belt type CVT flange. This limitation is overcome by the arrangement of the loading pulley 10 shown in FIG. 2. In this arrangement, the flange 16 on the right is supported at a fixed location by a bearing 40. A thrust bearing 42 to the right of the fixed bearing transmits the loading force being applied by the center shaft 44 to flange 16 while allowing the center shaft to rotate freely with the flange. While this thrust bearing transmits an extremely high force, it does not dissipate power since its rotational freedom is limited to the rotational angle of the cam loading mechanism, to be further described.

A preload spring 46 provides a minimum preload which sets a lower limit to insure a safe minimum contact force in the absence of output torque. In addition, a hydraulic cushion mechanism 48 is provided to cushion shock upon torque reversal. Under condition of torque reversal, the shaft 44 moves to the right momentarily under the impetus of the spring 46 so as to maintain the required minimum level of loading force. When the cam loader 30 begins to apply axial force as a result of the reversed torque, the hydraulic cushion 48 prevents shock load. Since the generation of force by the cam loading mechanism requires an angular rotation of the elements, a torque reversal on the output produces an output shaft rotation during which torque is not transmitted. When the shaft rotation freedom is used up and the cam loader applies the loading due to the torque in the opposite direction, kinetic energy has been stored in the output inertia. If this energy is not dissipated, it can produce a momentary torque load in the mechanism which, while it cannot produce slippage, can cause excessive stresses. The hydraulic cushion dissipates this energy. During a torque reversal, the preload spring 46 causes the hydraulic chamber within the cushion mechanism 48 to draw oil from a lubricating channel through a check valve 50 during the first half of the reverse rotation of the cam loader 30. During the second half of the reverse rotation, the hydraulic cushion attempts to rid itself of the oil. The check valve prevents the oil from leaving rapidly and instead forces it to leave through a restrictive orifice 52 thereby reloading the shaft at a sufficiently low rate to prevent excessive stress. The shaft loading is not compromised by this feature and is always instantaneously proportional to the transmitted torque.

The left flange 18 of pulley 10 is supported on the right flange 16 and splined to it to prevent relative rotation between the flanges. A hydraulic actuator includes cylinder 24 integral with the flange 18 and a piston 54, also splined to the right flange. The movable elements are supported on the shaft and free to be moved axially along the shaft by the actuator. The shaft 44 applies torque to the piston through the cam loading mechanism 30 which applies a force to drive the piston 54 to the right. The piston applies this force to the hydraulic fluid within the cylinder 24 and to the left flange 18. Since the transmission of this force occurs at the speed of sound in the materials involved, the action of the cam loading mechanism in applying a preload force to the belt is essentially instantaneous. The slope of the pulley flange faces is made sufficiently high so as to cause the belt 14 to slide along the flange face in response to a change in loading, thereby applying loading force to the other pulley 12. As a result, torque does not appear at the output until all of the transmission members have received the required loading. Similarly, a reduction of the output torque produces a corresponding reduction in loading.

A practical mechanism for control of the CVT is illustrated in FIGS. 1, 2 and 4. In this embodiment the hydraulic cylinder is controlled by a spool valve 56 integral with shaft 44 in response to the axial position of the cam loading mechanism 30 which is determined by its rotational position. The left groove 58 of the spool valve is connected to either a source of high pressure oil, or, in this case, to a control valve 60, FIG. 1, on the oil supply pump 28 through a port in the shaft and the housing port 72. The center groove 64 is connected to the hydraulic cylinder 24 and through a port 66 in the shaft to the hydraulic cushion 48 to maintain its charge, and through the shaft to housing port 68 to receive oil from pump 28 and supply oil to the cylinder. The right groove 70 is connected through another port in the shaft to housing port 62 to an external relief valve 74 to oil reservoir 76.

The cam loading mechanism 30 acts to apply the correct loading force to flange 18, but since it has a limited travel, the valving acts to change the volume of oil in the cylinder 24 so as to reposition the cam loader to the center of its range. The cam loading mechanism is maintained within the operating range at all transmission ratios. During operation, not shown, when the faces of the cam loader are close, the spool valve moves to connect the ports to discharge oil from the cylinder through the relief valve to the reservoir. This causes the cam loader to compensate by rotating to maintain the necessary torque, driving its faces further apart and stopping the relief of oil from the cylinder. When the cam loader faces are near their extreme separation, the spool valve moves to connect the ports so that the pump forces more oil into the cylinder. Again, in order to maintain the torque, the cam loader is forced to rotate to bring the faces closer together and thus stop the flow of oil. A dead band between the extreme positions of the ports minimizes the use of hydraulic fluid. Preload pressure is always applied to oil in the center port which provides sufficient pressure to control the position of the other pulley 12 operated by a larger piston. The preloaded pulley 10 therefore serves as a hydrostatic pressure source for the system. It is noted that the hydraulic valve mechanism may be of a rotary type rather than a spool type if suitable to the mechanical design.

During torque reversals, the load force provided by the cam would be lost momentarily if it were not for the preload spring 46 which acts to maintain a minimum level of force through the cam. Under these conditions, the shaft 44 moves to the right. This would cause loss of oil from the cylinder 24 if it were not for the relief valve 74 on the return line. By setting the relief valve at a pressure in excess of that generated in the loading cylinder by the preload spring, oil dumping during the torque reversal is eliminated. Mechanical power is delivered to or from the loading pulley by a spline 78 shown at the left end of the driven shaft 44 which typically supplies power to the wheels.

The control or driver pulley 12, in one embodiment of the CVT, is shown in FIG. 4. The flanges 20, 22 are positioned by an integral hydraulic cylinder 26 controlled by a servo valve which is a spool valve 80 within shaft 82. The area of cylinder 26 is made larger than the area of the loading cylinder 24 on pulley 10 so that, with the valve 80 supplied by an oil port connected to the loading cylinder, the positioning cylinder is able to overpower the loading cylinder and thereby control the flange position. Cylinder 26 and flange 20 thus control movement of belt 14 to change the transmission ratio and power output supplied by driven shaft 44 to the vehicle wheels upon an external command determined by the operator and driving conditions. The left end of the spool valve connects to a source of control pressure through a port in the shaft and the housing port 84. The right end of spool valve 80 connects to a source of reference pressure through a port in the shaft to housing port 86. Oil from the right end of the spool valve escapes through an orifice 88 which is restricted by a sloped section 90 integral with the hub of the right pulley flange 20. The pressure at the right end of the spool valve is determined by the pressure balance occurring between the supply orifice and the flow restriction caused by the sloped section at the discharge. This pressure is a function of the flange position and allows the spool valve to control the position of the cylinder 26 in response to the control pressure on port 84. A proportioning spring 92 is placed at the right end of the spool valve in order to provide a proportional control range for servo stability. Oil is supplied to the spool valve 80 through a port in the shaft 82 from housing port 94 which is fed from housing port 68 of pulley 10. Oil is returned from the spool valve through a port in the shaft and housing port 96 to the reservoir 76.

An embodiment of the hydraulic control system is shown in FIG. 1. In this system, the loading cylinder 24 acts as the hydraulic pressure reservoir. Oil is supplied from positive displacement engine driven pump 28 through check valve 98 to port 68 on the loading pulley housing in contact with the loading cylinder. Oil is returned from loading pulley port 62 through relief valve 74 to reservoir 76. As the cam loading mechanism moves to a position where more oil is required to be added to the loading cylinder, oil begins to flow from port 72 through an orifice 100 to the reservoir. As this flow increases, pressure increases at port 102 of pump control valve 60. The output of the pump is applied to ports 104, 106 of that valve. With spool 108 in the position shown, port 106 is connected to port 110 and the oil supplied by pump 28 is returned directly to reservoir 76, causing the pump output pressure to be low. When the pressure at port 102 increases sufficiently, it produces a force on spool 108 to move it to the right, the force being greater than the force on the piston 112 activated by the pressure from loading piston 54 at port 114. The spool movement to the right, blocks the pump discharge. This causes pump pressure to exceed the loading pressure and supply oil through the check valve to the loading cylinder at port 68. This pressure is also applied through port 104 to increase the force moving the spool to the right to insure a positive action of the pump valve. As oil is added to the loading cylinder through port 68, the valving for the loading cylinder causes the flow from port 62 to diminish, reducing the pressure at port 102. When the pressure falls sufficiently, the spool 108 moves to the left, reconnecting ports 106 and 110. The pump output pressure then falls to essentially zero, removing the pressure from port 104 to again insure positive valve action. Hydraulic cushions are also provided to prevent operation of the valve from producing excessive impact forces on the internal parts.

The pressure at port 68 of the loading pulley is also applied to port 94 of the control pulley and to a pressure regulator valve 116 which supplies control pressure to the spool valve 80 within the control pulley shaft. This pressure is applied directly to port 86 to act as a reference pressure for valve 80 and through an externally operated control valve 118 to port 84. The pressure at port 84 is applied to position spool valve 80 in control pulley 12 as previously described.

While the hydraulic system could be configured to use a constant pressure hydrostatic source, such an approach is less desirable since the loading system requires a large amount of instantaneous hydraulic power. Low cost hydraulic pressure systems typically operate using constant displacement pumps with a relief valve used to return the unneeded flow to the reservoir. With the pump sized to provide the highest rate of flow required at the highest pressure and the relief valve adjusted to provide the maximum pressure that may ever be required, the power demanded by the pump on a continuous basis is equal to the peak hydraulic demand and represents considerable energy wastage. In the present configuration, the pump discharge pressure is essentially zero when oil is not demanded and is equal to the actual present requirements of the loading system when oil is demanded. As a result, the average power demands (the time integral of pump flow times discharge pressure) of the system are low compared to the peak power demand during a ratio change under high torque output. The pump control valve used permits the positive displacement pump to provide oil only as required and at a pressure required by the actual load. The loading cylinder acts as the pressure reservoir for the system.

The present invention thus provides an improved continuously variable transmission which permits the loading force on the CVT to vary with the output torque requirements to result in improved efficiency for various driving conditions. While only a single embodiment has been illustrated and described, it is apparent that other variations may be made in the particular design and configuration without departing from the scope of the invention as set forth in the appended claims.

What is claimed:

1. A continuously variable transmission comprising:
   a first rotatable shaft;
   a second rotatable shaft, one of said shafts being a driver and the other being a driven shaft;
   a loading pulley secured to said first shaft, aid loading pulley including a first fixed flange rotatable with said first shaft and axially movable flange rotatable with said first shaft and axially movable along said shaft within a given spacing with respect to said fixed flange;
   torsional loading means secured to and rotatable with said first shaft, said loading means providing an axial force proportional to torque applied by said first shaft;
   a first hydraulic actuator coupled between said torsional loading means and said first movable flange and axially movable by said torsional loading means for transmitting said axial force to said first movable flange;
   a hydraulic valve secured directly on and rotatable with said first shaft for supplying and removing hydraulic fluid to and from said first hydraulic actuator and movable in response to movement of said loading means to maintain said loading means within a given operating range at all transmission ratios;
   a control pulley secured to said second shaft, said control pulley including a second fixed flange rotatable with said second shaft and a second movable flange rotatable with said second shaft and axially movable along said second shaft within a given spacing with respect to said second fixed flange, said loading pulley and control pulley flanges having inner faces sloping outwardly from respective said shafts;
   a second hydraulic actuator coupled to said second movable flange for applying an axial force thereto, said second hydraulic actuator being capable of applying a greater force to said second movable flange than that applied to said first movable flange to control the position of said second movable flange;
   hydraulic fluid means for applying hydraulic fluid to said second hydraulic actuator to move said second movable flange axially to a position determined by an external command;
   a source of hydraulic fluid and control means supplying said fluid to said first and second hydraulic actuators and valve and to said hydraulic fluid means; and
   a V-belt having a fixed length and width connected between and engaging said inner faces of said loading and control pulleys and slidable along said faces for transmitting power and changing the transmission ratio between said shafts, said first hydraulic actuator and first movable flange applying a force to said belt in proportion to said force applied by said loading means, said hydraulic fluid means controlling the position and movement of said second movable fluid into engagement with said belt for controlling the power transmission ratio of said belt between said shafts.

2. The device of claim 1 wherein said driver shaft is adapted to drive the wheels of a vehicle and said driven shaft is adapted to be driven by a prime mover engine.

3. The device of claim 1 including thrust bearing means mounted on said first shaft for transmitting force from said first shaft to said loading pulley first fixed flange.

4. The device of claim 3 including hydraulic cushion means mounted on said first shaft for cushioning shock during torque reversals.

5. The device of claim 4 including resilient preload means for applying a minimum preload force to said loading pulley and belt in the absence of output torque.

6. The device of claim 5 wherein said torsional loading means is a cam loader.

7. The device of claim 6 wherein said hydraulic actuators include hydraulic cylinders and pistons applying force to said movable flanges of said pulleys.

8. The device of claim 7 wherein said second hydraulic actuator includes a hydraulic cylinder and piston having a larger area than that of said first hydraulic actuator.

9. The device of claim 8 wherein said hydraulic fluid means is a second hydraulic valve secured on and rotatable with said second shaft.

10. The device of claim 9 wherein said hydraulic valves are spool valves.

11. The device of claim 8 wherein said source of hydraulic fluid and control means includes a hydraulic pump and control valve.

12. The device of claim 11 including hydraulic pressure regulating means.

* * * * *